United States Patent [19]

Hirsch

[11] Patent Number: 5,772,903
[45] Date of Patent: Jun. 30, 1998

[54] TAPERED CAPILLARY OPTICS

[76] Inventor: Gregory Hirsch, 365 Talbot Ave., Pacifica, Calif. 94044

[21] Appl. No.: 721,871

[22] Filed: Sep. 27, 1996

[51] Int. Cl.[6] .................................................. C03C 25/06
[52] U.S. Cl. ................................ 216/11; 216/24; 216/56; 216/84; 216/85; 216/92; 156/345 L; 156/345 LC; 185/12
[58] Field of Search .................................. 216/11, 24, 56, 216/84, 85, 92; 156/345; 427/163.2, 534; 65/31, 387, 429; 185/12, 31, 43, 47, 48

[56] References Cited

U.S. PATENT DOCUMENTS

| | | | |
|---|---|---|---|
| 2,628,936 | 2/1953 | Albano | 216/11 |
| 4,445,751 | 5/1984 | Divens et al. | 216/11 |
| 4,513,190 | 4/1985 | Ellett et al. | 219/56.21 |
| 4,564,417 | 1/1986 | Schoen et al. | 156/633 |
| 4,750,806 | 6/1988 | Biswas | 350/96.3 |
| 4,853,020 | 8/1989 | Sink | 65/4.1 |
| 5,100,507 | 3/1992 | Cholewa et al. | 216/11 |
| 5,101,422 | 3/1992 | Thiel et al. | 378/145 |
| 5,290,398 | 3/1994 | Feldman et al. | 216/11 |
| 5,480,049 | 1/1996 | Marchman | 216/24 |
| 5,662,817 | 9/1997 | Honmou | 216/24 |

*Primary Examiner*—R. Bruce Breneman
*Assistant Examiner*—Anita Alanko
*Attorney, Agent, or Firm*—Townsend and Townsend and Crew LLP

[57] ABSTRACT

A metal or glass wire is etched with great precision into a very narrowly tapering cone which has the shape of the desired final capillary-optics bore. By controlling the rate of removal of the wire from an etchant bath, a carefully controlled taper is produced. A sensor measures the diameter of the wire as it leaves the surface of the etchant. This signal is used for feedback control of the withdrawal speed. The etched wire undergoes a treatment to produce an extremely low surface-roughness. The etched and smoothed wire is coated with the material of choice for optimizing the reflectivity of the radiation being focused. This could be a vacuum evaporation, sputtering, CVD or aqueous chemical process. The coated wire is either electroplated, built up with electroless plating, or encapsulated in a polymer cylinder such as epoxy to increase the diameter of the wire for easier handling and greater robustness. During this process, the wire is vertically oriented and tensioned to assure that the wire is absolutely straight. The coated and electroformed wire is bonded to a flat, rigid substrate and is then periodically segmented by cutting or etching a series of narrow slits or grooves into the wire. The wire is vertically oriented and tensioned during the bonding process to assure that it is straight. The original wire material is then chemically etched away through the slits or otherwise withdrawn to leave the hollow internal bore of the final tapered-capillary optical element.

22 Claims, 8 Drawing Sheets

TAPERED CAPILLARY OPTICS

This invention was made with Government support under DOE Grant No. DE-FG03-96ER82185. The Government has certain rights in this invention.

This invention relates to the formation of capillary optics to focus X-rays or neutrons by grazing incidence. More particularly, a capillary formation process is disclosed which comprises: coating a finely tapered wire with an optimized radiation reflecting coating, building up the coated wire with a reinforcing layer, and finally removing the material of the wire to leave the completed tapered capillary optic.

BACKGROUND OF THE INVENTION

Techniques to produce extremely small-diameter X-ray and neutron microbeams are currently attracting a great deal of interest in the scientific community. Many experiments at neutron and synchrotron radiation facilities will greatly benefit from the higher spatial resolution measurements obtainable by utilizing these capabilities. Several methods have been developed to produce microbeams which will now be described.

In the soft X-ray range, Fresnel zone-plates have produced beam sizes down to ~300 Å (Anderson, E. H. and Kern, D., "Nanofabrication of zone plates for X-ray microscopy," in Michette, A. G., Morrison, G. R. and Buckley, C. J. (eds.), *X-Ray Microscopy III*, Springer-Verlag, New York, (1992) pp. 75–78). This technology has found significant application in soft X-ray microscopy. Zone-plate technology has also been applied to hard X-ray focusing applications by utilizing either special thick phase-zone-plates (Yun, W. B., Lai, B., Legnini, D., Xiao, Y. H., Chrzas, J., Skulina, K. M., Bionta, R. M., White, W. and Cerrina, F., "Performance comparison of hard X-ray zone plates fabricated by two different methods," *Proc. Soc. Photo-Opt. Instrum. Eng.*, (1993) 1740: 117–129) or Bragg-Fresnel zone plates (private communication noted in Reference 9). The beam sizes achieved with these two types of hard X-ray focusing elements are 6500 Å and 8000 Å, respectively. A very significant disadvantage of zone plates is their intrinsic wavelength dependent focal length which prevents the sharp focusing of polychromatic radiation.

The use of grazing-incidence optics for producing X-ray microbeams is a fairly mature technology. Spot sizes of 2 microns have been achieved (reported in *"Center for X-Ray Optics* 1989," LBL-28001 UC-411, Lawrence Berkeley Laboratory, (1990) pp. 4-11–4-12), with 1 micron beams foreseeable at third-generation synchrotron sources. The limitations to improving this performance level are due to the difficulties in producing nearly perfectly figured mirrors, and the emittance characteristics of the synchrotron radiation input beam.

Arrays of numerous carefully positioned and curved glass capillaries, known as Kumakhov optics, have been developed as focusing elements for X-rays (Kumakhov, M. A., "Channeling of photons and new X-ray optics," *Nucl. Instrum. Methods*, (1990) B48: 283–286). These devices allow the focusing of broad-band radiation. The size of the focused spot is dependent on the diameter of the individual capillaries as well as the precision in which they are aligned. The smallest spot sizes achieved are roughly 1 millimeter. It is unlikely that this technology will produce spot sizes comparable to those achieved with zone plates or grazing incidence mirrors. In addition to X-ray focusing, there have been some initial studies of neutron focusing with Kumakhov optics (Kumakhov, M. A., Sharov, V. A. and Kzardakov, V. V., "Neutron focusing using capillary optics," *Proc. Soc. Photo-Opt. Instrum. Eng.*, (1992) 1738: 368–376).

A different multicapillary-based focusing technique uses microchannel plates, with either round or square channels (Chapman, H. N., Nugent, K. A., Wilkens, S. W. and Davis, T. J., "Focusing and collimation of X-rays using microchannel plates: An experimental investigation," *J. X-Ray Sci. Technol.*, (1990) 2: 117). X-rays incident from a source reflect off the channel walls and are brought to a distant focus. The smallest spot size achieved is roughly 150 microns with this method.

The capillary technology with the greatest success in producing very small hard X-ray microbeams is the tapered capillary concentrator (Bilderback, D. H., Thiel, D. J., Pahl, R., and Brister, K. E., "X-ray applications with glass-capillary optics," *J. Synchrotron Radiat.*, (1994) 1: 37–42 and references therein). This device is simply a single glass tube which has been drawn at elevated temperature to have a decreasing diameter bore from the entrance to the exit. Radiation which enters the large end of the tube undergoes repeated total external reflections at grazing incidence along the capillary wall, until it exits the small diameter output end. The decrease in the beam diameter is accompanied by an increase in the beam divergence, as is apparent by ray tracing, and required by Liouville's Theorem. The current minimum beam diameter achieved is ~500 Å (Bilderback, D. H., Hoffman, S. A. and Thiel, D. J., "Nanometer spatial resolution achieved in hard X-ray imaging and Laue diffraction experiments," Science, (1994) 263: 201–203). One great advantage of this approach is that the beam size is determined simply by the exit diameter of the capillary. The challenge to optimizing this type of focusing element is to maximize the throughput of radiation and thereby obtain the highest X-ray flux per unit area. This is achieved by the optimal shaping of the capillary bore profile, optimizing the capillary wall material, and minimizing the surface roughness of the capillary bore. There has also been a small amount of published work on neutron focusing utilizing conical focusing guides (Magerl, A., Frick, B. and Liss, K. D., "First experience with the focusing guide on INlOC," *Proc. Soc. Photo-Opt. Instrum. Eng.*, (1992) 1738: 360–367).

In the case of a parabolically tapered capillary, it is actually possible to get extremely efficient transmission with only one reflection inside the capillary (Balaic, D. x., Nugent, K. A., Barnea, Z., Garrett, R., Wilkins, S. W., "Focusing of X-rays by Total External Reflection from a Parabloidally Tapered Glass Capillary," *J. Synchotron Rad.,* 2(6), 296–299 (1995). In this case, the capillary functions as a true lens, rather than a concentrator; with the focal spot some distance from the capillary exit. This is an important advantage in cases where it is problematic to have a very short working distance between the capillary exit and the sample.

In addition to the monocapillary device, there has also been some investigation of drawn glass polycapillary concentrators (several hundred channels) which have the advantage of a shorter overall length, and a "focal spot" which is some distance from the end of the capillary, rather than right at the exit (Hoffman, S. A., Thiel, D. J. and Bilderback, D. H. *Nuclear Instrumentation Methods*, in press). Unfortunately, the spot sizes attained are some three orders of magnitude larger than achieved with monocapillaries.

A number of technical issues have prevented tapered glass capillaries from achieving their theoretical performance level. Among these deficiencies has been the inability to provide an optimized radiation reflective interior surface of the capillary; production techniques do not allow for such coatings to be placed within the extremely small dimension of such drawn tubes. By way of example, the entrance to such tubes can be in the order of 100 micron with the tube tapering to considerably narrower dimensions at their focused discharge.

A new approach for fabricating tapered capillaries for X-ray and neutron microfocusing should significantly reduce the current deficiencies of drawn glass capillaries and allow the full potential of this methodology to be reached.

Synchrotron radiation and neutron-scattering user facilities has greatly expanded our understanding of problems in a wide range of scientific disciplines. Improving the spatial resolution of measurements performed at these facilities is a very important aspect of helping to understand the scientific problems being investigated. High spatial resolution experiments are probably the most important beneficiaries of the high brightness third-generation synchrotron sources which have been built or are under construction. The limited flux from neutron sources has always required that fairly large samples be used. This has led to the need for higher flux sources. Efficient collection and focusing of neutron beams would greatly extend the types of samples studied, and the knowledge of their small scale structure.

The performance of a capillary concentrator can be specified by two parameters, the exit beam size and the gain of the device:

$$G = T(A_{in}/A_{out})$$

where T is the fraction of radiation incident on the capillary entrance aperture which leaves the exit aperture, and $A_{in}$ and $A_{out}$ are the areas of the capillary entrance and exit. Stated in other terms, the gain is the relative increase in flux leaving the exit of the capillary compared to a straight tube or aperture with the same diameter. The primary impediment to improving the performance of current tapered capillary concentrators is the difficulty in producing capillaries with the optimal figure (taper-profile and straightness of the bore). The non-optimal capillary-bore profile results in an inefficient transmission of radiation to the capillary exit as the radiation undergoes multiple reflection. Eventually, incident radiation exceeds the critical angle for total external reflection and is lost. There is, of course, loss of flux even for angles of incidence less than the critical angle due to the reflection coefficient being less than unity. A capillary with the simplest shape, a linear taper, is a fairly inefficient device. With current drawing techniques, it is difficult to achieve the desired bore profiles which are ellipsoidal or parabolic (Bilderback, et al., *J. Synchrotron Radiat.*, (1994) 1: 37–42 and references therein; Thiel, D. J., Bilderback, D. H. and Lewis, A., "Focusing of synchrotron radiation using tapered glass capillaries," *Physica*, (1989) B158: 314–316; Thiel, D. J., Bilderback, D.H., and Lewis, A., "Production of intense micrometer-sized X-ray beams with tapered glass monocapillaries," *Rev. Sci. Instrum.*, (1993) 64: 2872–2878). In addition to the problem of the non-optimal capillary profile, the capillary bore center-line tends to wander a considerable amount in the glass from side-to-side, instead of following a straight line (Thiel, et al. *Rev. Sci. Instrum.*, (1993) 64: 2872–2878). This results in loss of flux as the beam is bent. Some work is being done to improve the drawing of tapered capillaries by constructing automated glass pullers. Bilderback, D., Pahl, R., Freland, R., "A New Computerized Capillary Puller for Hard X-Ray Applications", *Chess Newsletter*, 1995, 41–43 (1995). It is important that the glass tubing used is as perfect as possible to achieve the best capillaries, but the production of nearly perfect glass tubing is very difficult.

The glass capillary material itself, while possessing an excellent surface roughness value, is not the ideal material for high reflectivity. The critical angle for X-rays is determined by the refractive index of the material:

$$n = 1 - \delta - i\beta$$

and can be derived by Snell's Law to give:

$$\theta_c = (2\delta)^{1/2} \text{ (assuming } \beta = 0)$$

The theoretical value for $\delta$ is:

$$\delta = (Ne_2/2\pi mc^2)^{1/2} = 2.70 \times 10^{10} Z\rho\lambda^2 A.$$

As an example, the critical angle for borosilicate glass at $\lambda = 1$ Å is approximately 2.5 milliradians.

It can be seen that the ideal material choices for high critical angle reflecting surfaces are high density materials such as platinum or gold. For this reason, these materials are commonly used for coating grazing-incidence focusing mirrors at synchrotron radiation sources. For achieving high neutron reflectivity, certain isotopes are desirable. A particularly good material is the isotope $Ni^{58}$. Coating the interior of very small glass capillaries is not a simple proposition. For submicron diameters, it would appear to be virtually impossible to deposit high quality films.

A further problem with glass is its very low thermal conductivity. With the high power-density of synchrotron radiation, especially from insertion device sources, there is significant heating of the capillary material. This can cause thermally induced distortion of the capillary. With the new third-generation sources, this could become a very significant issue, including the possible destruction of the focusing element.

There are several groups actively working on developing and using tapered capillary devices at synchrotron sources worldwide. Results have been reported from Cornell (CHESS), NSLS, and ESRF ("X-Ray Microbeam Techniques and Applications," Conference Workshop held at Synchrotron Radiation Instrumentation '94, Jul. 17, 1994, SUNY at Stony Brook, unpublished). The largest amount of published work has been accomplished by the Cornell group and collaborators (Bilderback, et al., *J. Synchrotron Radiat.*, (1994) 1: 37–42 and references therein; Bilderback, et al., *Science*, (1994) 263: 201–203; Hoffman, et al., *Nuclear Instrumentation Methods*, in press; Thiel, et al. *Physica*, (1989) B158: 314–316; Thiel, et al., *Rev. Sci. Instrum.*, (1993) 64: 2872–2878). Tapered glass capillaries have recently been introduced commercially for use with conventional X-ray tube sources.

SUMMARY OF THE INVENTION

A metal or glass wire is etched with great precision into a very narrowly tapering cone which has the shape of the desired final capillary bore. By controlling the rate of removal of the wire from an etchant bath, a carefully controlled taper is produced. A sensor measures the diameter of the wire as it leaves the surface of the etchant. This signal is used for feedback control of the withdrawal speed. The etched and polished wire is coated with the material of choice for optimizing the reflectivity of the radiation being focused. This could be a vacuum evaporation, sputtering, CVD or aqueous chemical process. The coated wire is either electroplated, built up with electroless plating, or encapsulated in a polymer cylinder such as epoxy to increase the diameter of the wire for easier handling and greater robustness. During this process, the wire is vertically oriented and tensioned to assure that the wire is absolutely straight. The coated and electroformed wire is bonded to a flat, rigid substrate and is then periodically segmented by cutting or etching a series of narrow slits or grooves into the wire. The wire is vertically oriented and tensioned during the bonding process to assure that it is straight. The original wire material is then chemically etched away through the slits to leave the hollow internal bore.

DESCRIPTION OF THE PREFERRED EMBODIMENT

The invention addresses the issues stated in the discussion of the performance of a capillary concentrator. The manufacturing process is schematically illustrated in FIGS. 1–4. Note that these figures are not drawn to scale.

Figure 1:
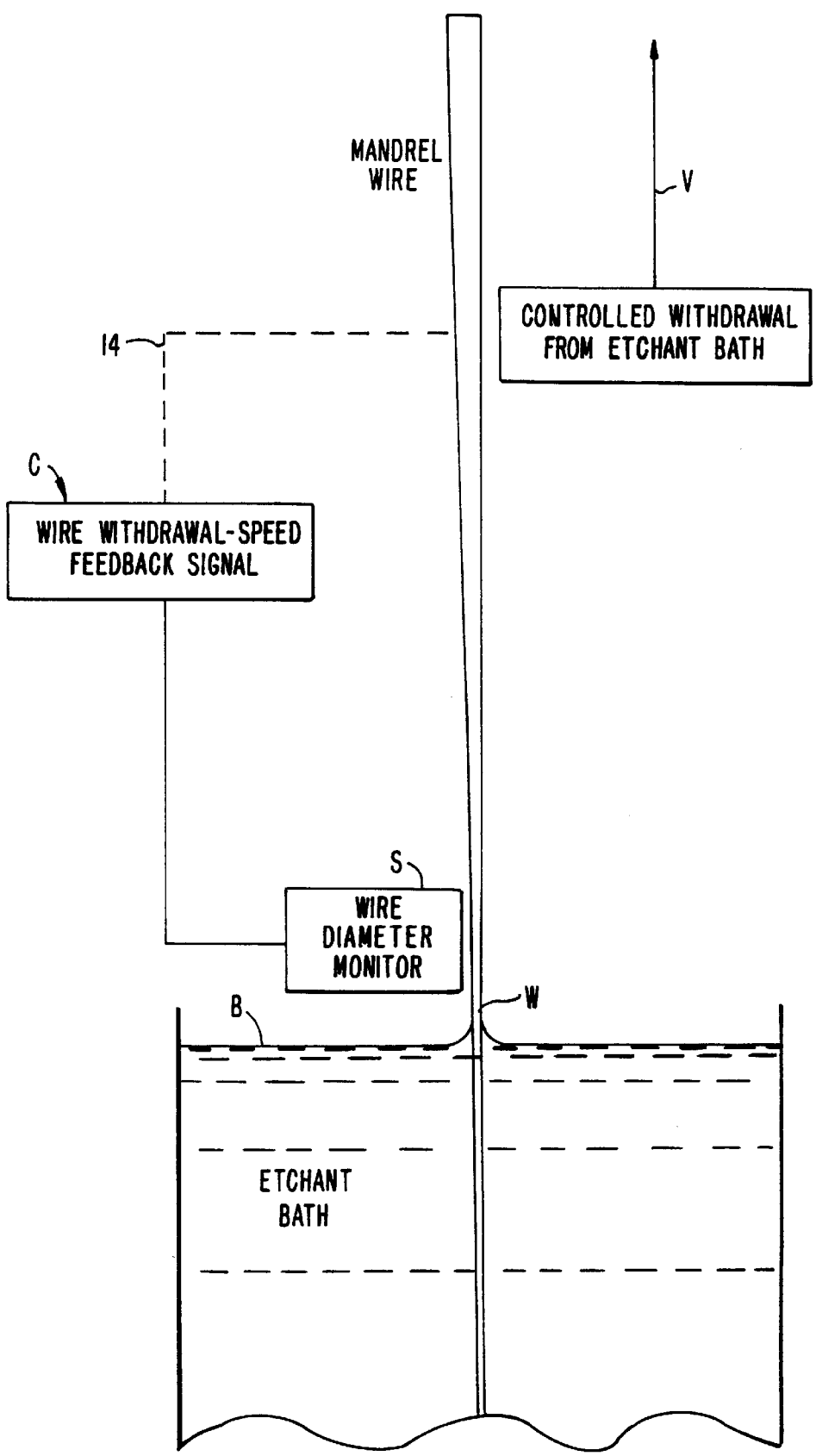
FIG. 1 is a schematic illustrating the controlled withdrawal of a mandrel wire from an etchant bath for creating the tapered structure of the capillary optic.

The proposed fabrication technique has four basic steps:

Referring to FIG. 1, metal or glass wire W is with drawn upward at velocity V which is typically a variable rate from etchant bath B. Metal or glass wire W is etched with great precision into a very narrowly tapering cone which has the shape of the desired final capillary bore. The etching process itself, or a post-treatment process, polishes the wire to a surface roughness as smooth as possible. As will be described later, I prefer the use of special etchable-glass materials for this step, but certain metal wires are possibilities. Sensor S measures the diameter of the wire as it leaves the surface of the etchant. This signal is used by feedback control C for control of withdrawal velocity V through feed back loop 14. Where metal or glass wire W is in etchant bath B, it will be observed that the wire has a constant (and shrinking) diameter. Where metal or glass wire W leaves etchant bath B it will be seen that the tapered construction is present.

Figure 2:
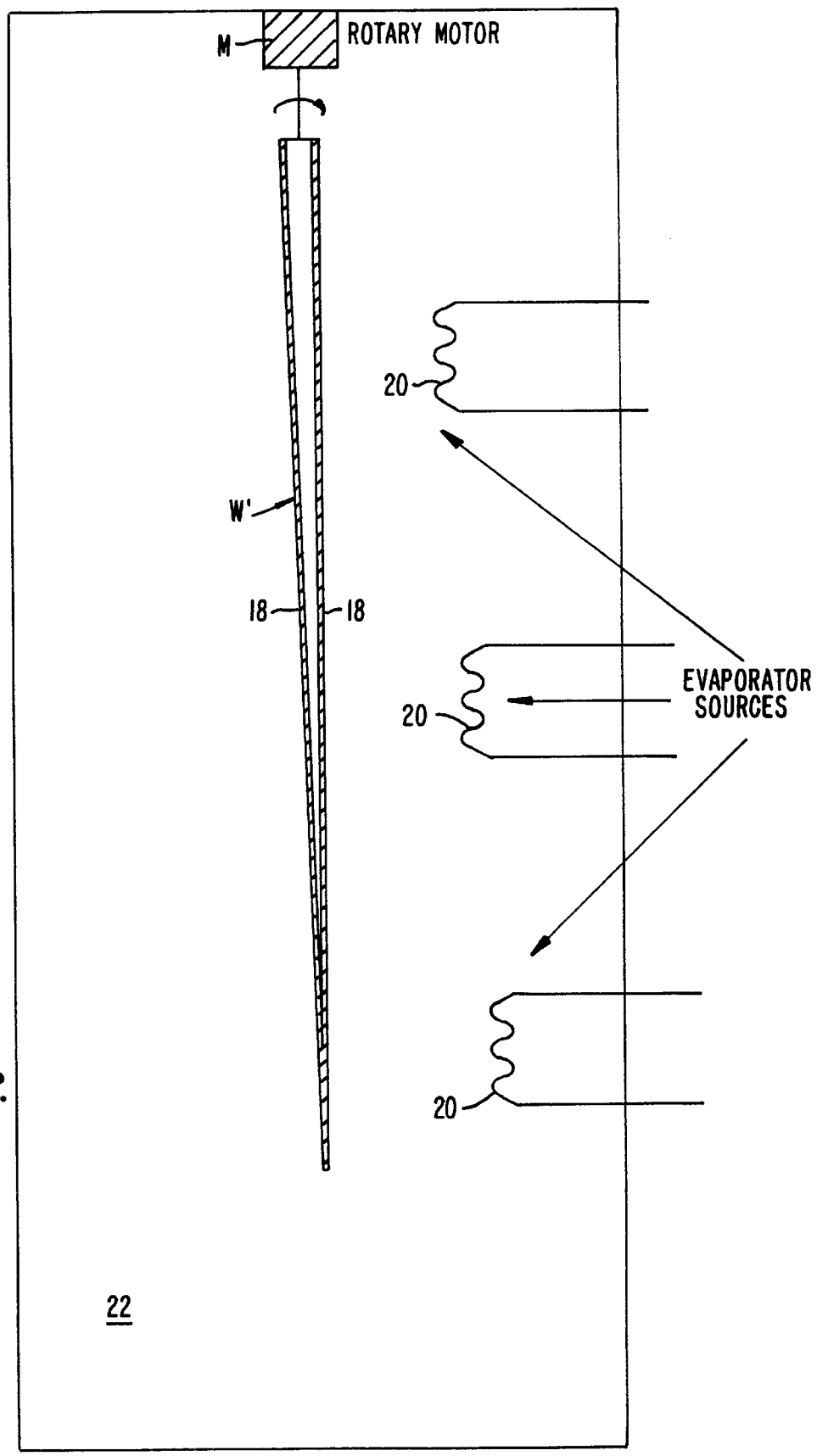
FIG. 2 illustrates the etched and polished wire of FIG. 1 being coated with a material for optimizing the reflectivity of the radiation to be focused by the tapered capillary optic.

Referring to FIG. 2, etched and polished wire W' is coated with the material of choice at coating 18 for optimizing the reflectivity of the radiation being focused. Materials can include platinum, gold, or other materials commonly used for coating grazing-incidence focusing mirrors at synchrotron radiation sources, as well as many other materials. Coating can be of any conventional technique including vacuum evaporation, sputtering, CVD, or an aqueous chemical process. FIG. 2 is illustrated with vacuum evaporation from heated sources 20 while etched and polished wire W' is rotated at motor M within vacuum chamber 22.

Figure 3:
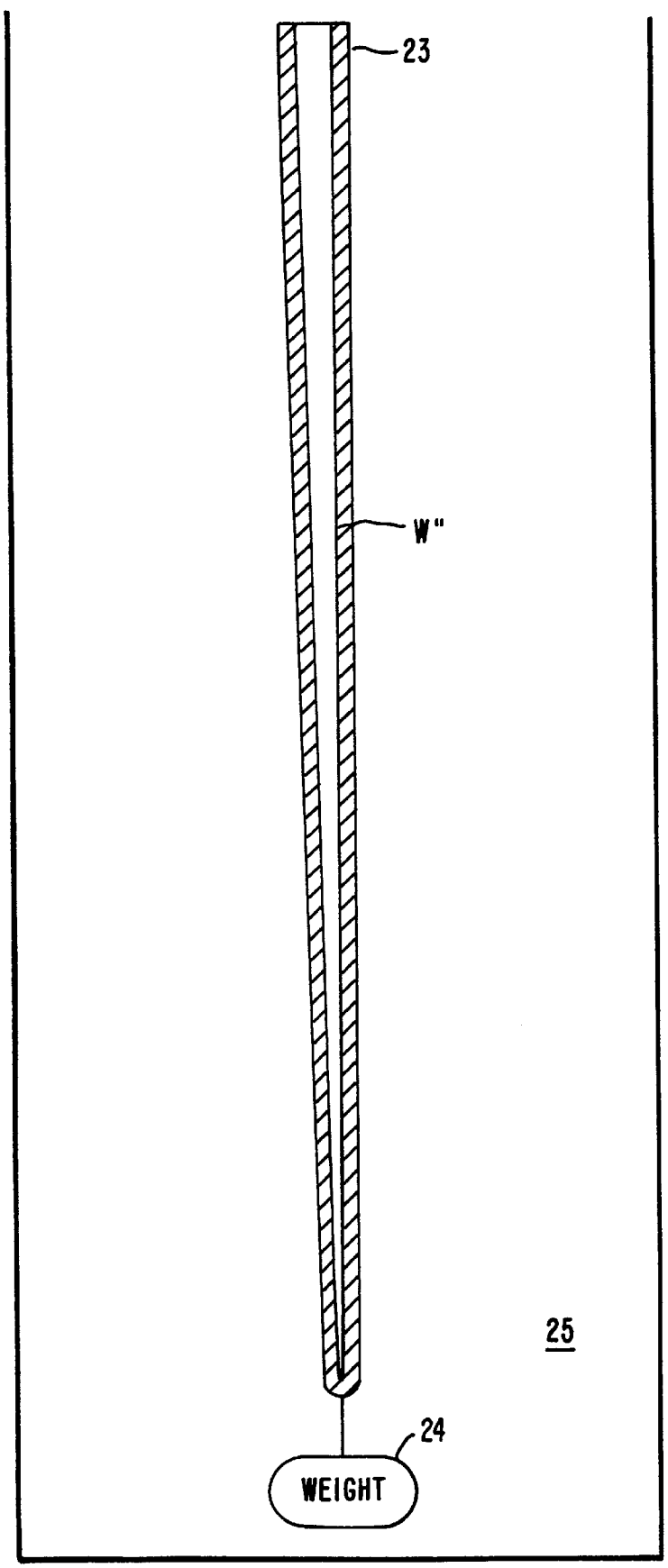
FIG. 3 illustrates the building up of the coated wire of FIG. 2 to increase the diameter of the wire for easier handling and greater robustness.

Referring to FIG. 3, coated wire W" is either electroplated, built up with electroless plating, or encapsulated in a polymer cylinder such as epoxy to increase the diameter of the wire for easier handling and greater robustness. It is possible that a combination of metal and polymer will be advantageous. During this process, the wire is vertically oriented and tensioned between support 23 and weight 24 to assure that the wire is absolutely straight. Such coating is illustrated in FIG. 3 being applied by electroless bath 25.

Figure 4:
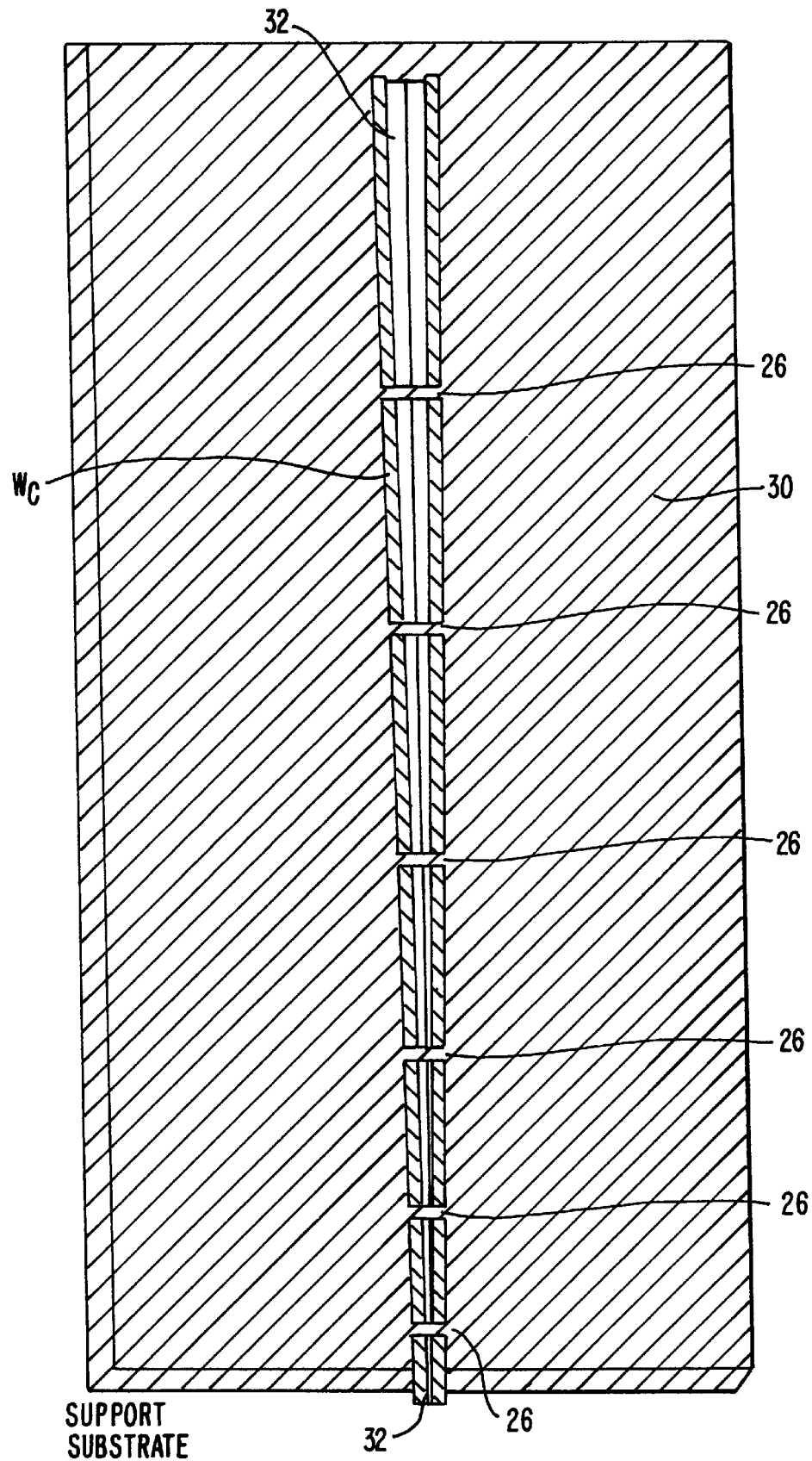
FIG. 4 shows the built up structure of FIG. 3 fastened to a substrate and periodically slit to enable an etchant to remove the tapered structure produced in FIG. 1 and to leave the completed tapered capillary optic of this invention.

Referring to FIG. 4, coated and electroformed wire $W_c$ is bonded to a flat, rigid substrate and is then periodically segmented by cutting or etching a series of narrow slits or grooves 26 into the coated and electroformed wire $W_c$. As illustrated in FIG. 3, coated and electroformed wire $W_c$ is vertically oriented and tensioned during the bonding process to assure that it is straight. The original wire material is then chemically etched away through the slits to leave tapered hollow internal bore 32. Thus, the initial etched wire can be considered to be an expendable mandrel for subsequent vacuum deposition and electroforming, and I will refer to this piece as the "mandrel wire." The grooves are spaced at the maximum distance apart, and the minimum width, consistent with a reasonable etching time.

Clearly, the spacing between grooves must decrease towards the exit end of the capillary. Although the grooves are illustrated here as completely sectioning the wire, it is only necessary to expose the central mandrel wire. This can be accomplished with grooves half the wire diameter deep.

The result of this process is a very sturdy capillary on the surface of the substrate which has an optimal figure, high thermal conductivity, and an optimized reflecting-surface material. There will be some loss of radiation at the segment gaps, but this is minor if the gap lengths are small compared to the segment lengths. The surface roughness of the capillary interior is excellent when the surface roughness of the mandrel wire is excellent, the coating process is correctly chosen, and the etching of the mandrel wire does not cause an increase in the coating surface roughness.

The materials selected for the manufacture of the capillary device (mandrel wire, reflecting capillary-interior coating, and reinforcing coating) are constrained by the manufacturing process. The removal of the mandrel wire to form the capillary bore must not effect the reflecting coating surface smoothness in any way. The reinforcing coating should also not be significantly attacked by the mandrel etchant. The dissolution of the mandrel should be reasonably rapid and take place without the evolution of gas bubbles which could interrupt the etching process in these small diameter capillaries. It is crucial to avoid deleterious electrochemical reactions due to the presence of different metal layers in electrical contact in a chemical bath.

Production of mandrel wires having extremely low surface roughness requires measuring and minimizing surface roughness of the etched mandrel wire. Although it is advantageous to have the wire etching process itself leave a suitably smooth surface, post-etch polishing techniques may be necessary if the original etched surface is not sufficiently smooth. The surface roughness may be measured by atomic force microscopy.

Optimal control of the etching process produces tapered wires with the desired taper profiles on demand in a reproducible manner. A system to measure the mandrel wire diameter as it leaves the etchant surface utilizes feedback control of the withdrawal speed.

An important aspect of producing the concentrator is the development of a suitable method for cutting grooves through the reinforcing coating. Methods to increase the etching speed of the mandrel wire are needed when the diffusion of acid into, and dissolved glass out of, the capillary is unacceptably slow.

Some of the key issues for producing improved taperedcapillary X-ray and neutron focusing-elements fall into the following categories: material compatibility with the manufacturing process; the achievement of sufficient surface smoothness of the capillary bores; the ability to reproducibly form capillary bores with the desired shapes; and the ability to fabricate the final capillary structures.

To identify the most promising material set for the construction of the focusing elements, the first obvious requirement is for the reflecting coating to be completely inert to the wire etchant. Any chemical reactivity would lead to dissolution, or in the very least, surface roughening. If a metal mandrel wire and coating combination is used, a further concern arises due to the different electrode potentials of the materials in the etchant. Since the wire and the coating are in electrical contact, electrochemical etching of the coating may occur, even in etchants which are normally non-reactive. An additional requirement with material combinations is that they do not form an alloy with each other. Alloy formation would almost certainly lead to surface roughening when the mandrel wire is etched away. For these reasons, the use of electrically insulating etchable-glass mandrels is preferred.

Production of the mandrel wires involves precision etching of special glass formulations which are similar to the core glasses used in microchannel plate manufacturing (Wiza, J. L., "Microchannel plate detectors," *Nucl. Instrum. Methods*, (1979) 162: 587–601). These materials dissolve rapidly, without any gas bubble evolution, in weak acidic solutions (0.1 N HCl solutions are adequate). The surface of the material appears flawless and absolutely smooth under optical microscopy at the highest power. Due to the non-crystalline nature of the glass material, which should eliminate uneven etching of material grains, the surface should also appear completely smooth under scanning electron microscopy. Etching of this material into smooth tapering cones causes them to become unresolved under light microscopy when the diameter falls below the wavelength of light. The very small size of the tips of the etched glass material can be observed by optical microscopy using a slightly defocused image. Under these conditions, interference fringes along the perimeter of the fiber do not connect at the tip. This is an established inspection method used when producing field emitters to indicate very small tip radii.

As in the case of capillary concentrators fabricated from glass tubing, it is important for the starting material to be nearly perfect with the method of the present invention. Fortunately, it is much easier to produce essentially perfect drawn glass fibers than it is to produce tubing. Surface tension forces act to eliminate any asymmetry in the glass cross-section during the drawing process.

The present invention includes the possibility of using certain metal mandrel wires. It is possible to electropolish wires into tapered cones with extremely smooth surfaces, as is done when producing specimens for field emission and field ion microscopy. Metal materials are also mechanically stronger and less brittle than glass. Nevertheless, due to the concerns with alloy formation, bubble generation, electrode potentials, slower etching speed, and generally more aggressive etchants, the use of etchable-glass mandrels is preferred.

The most desirable materials for high critical-angle X-ray reflectivity for the radiation reflecting coating are the high density materials gold, tungsten, tantalum, rhenium and platinum metals. Fortunately, these materials are also extremely chemically inert and do not react with the very dilute glass etching solutions. The isotope $Ni^{58}$ is a good reflector for thermal neutrons. Nickel is chemically a rather passive element and does not react with appropriately selected etching solutions.

The surface roughness of various capillary coating materials must be tested before and after chemical exposure to the mandrel etchant. Smooth X-ray mirrors may be tested by measuring their surface roughness using Atomic Force Microscopy (AFM).

To minimize possible electrochemical reactions when the wire is etched, the ideal choice for the reinforcing coating is the same material as the radiation reflecting coating. Fortunately, several of the materials which are good candidates for reflecting coatings can also be deposited in thick layers by electrochemical means. If $Ni^{58}$ is used for high neutron reflectivity, a thick layer of electroless nickel can be deposited on top of a thin layer of the vapor deposited material. Nickel is also a reasonably good X-ray reflector, although its density of 8.9 is not as desirable as some of the other previously mentioned high density metals. Gold is also commonly deposited with an electroless process. Standard electroplating is capable of depositing many other metals.

In one embodiment of the method, it may be advantageous to encapsulate the mandrel wire in cylinders of various reinforcing materials, e.g., polymer (plastic). This would eliminate any electrochemical concerns, since the only metal would be the reflecting coating material. The disadvantage of the low thermal conductivity of the polymer may be overcome by the use of polymer encapsulation to further strengthen a wire that has been partially built up with plating.

Since it is obviously necessary to select a mandrel material which can be produced with a sufficiently small surface roughness, the surface roughness of the mandrel wire material may be measured with Scanning Electron Microscopy (SEM) and AFM. SEM may be used to measure relatively large-scale roughness in the material. Since the glass material must be coated with a conducting metal film by sputtering prior to SEM examination, this technique cannot determine the very small-scale roughness of the glass (besides the limited resolution of the SEM itself). AFM examination must be used on the uncoated glass material to determine the true atomic roughness of the etched glass.

If the etched material is unacceptably rough, post-etching techniques exist to smooth the surface. Thermal annealing of the material will produce extremely smooth surfaces, as is well known to occur with glass when it is heated. This procedure may be accomplished in a furnace. It is important to control the temperature carefully to accomplish the desired smoothing of the glass by surface diffusion, while preventing distortion of the wire shape by too high of a temperature. This is possible due to the lower activation energy for surface diffusion than for bulk diffusion. The wire should be hung vertically during this step. If there is any slight bending of the wire during this annealing step, it will be removed during the electroforming step when the wire is tensioned. In another embodiment of the method, annealing of the wire may be performed while lying on a horizontal substrate. In that case, there might be a very narrow line of disturbance where the wire is touching the substrate, but most of the circumference of the wire will be unaffected.

Etchable glass tends to react slowly to the atmosphere. The surface of the material starts to become cloudy in appearance after several months if left exposed to the ambient atmosphere. Since this reaction is thought to be due to water vapor, the material should be kept in a dry atmosphere while it is being tested for surface smoothness.

The procedure for controlling the shape of the mandrel wire profile is to simply withdraw it in a controlled manner from the etchant. The diameter of the wire must be monitored as it leaves the etchant surface to control the velocity accordingly. It is important to select a feedback time-constant that is short enough to produce an accurate wire profile, but not so short as to cause high spatial frequency variations in the wire diameter due to sampling errors.

Figure 5:
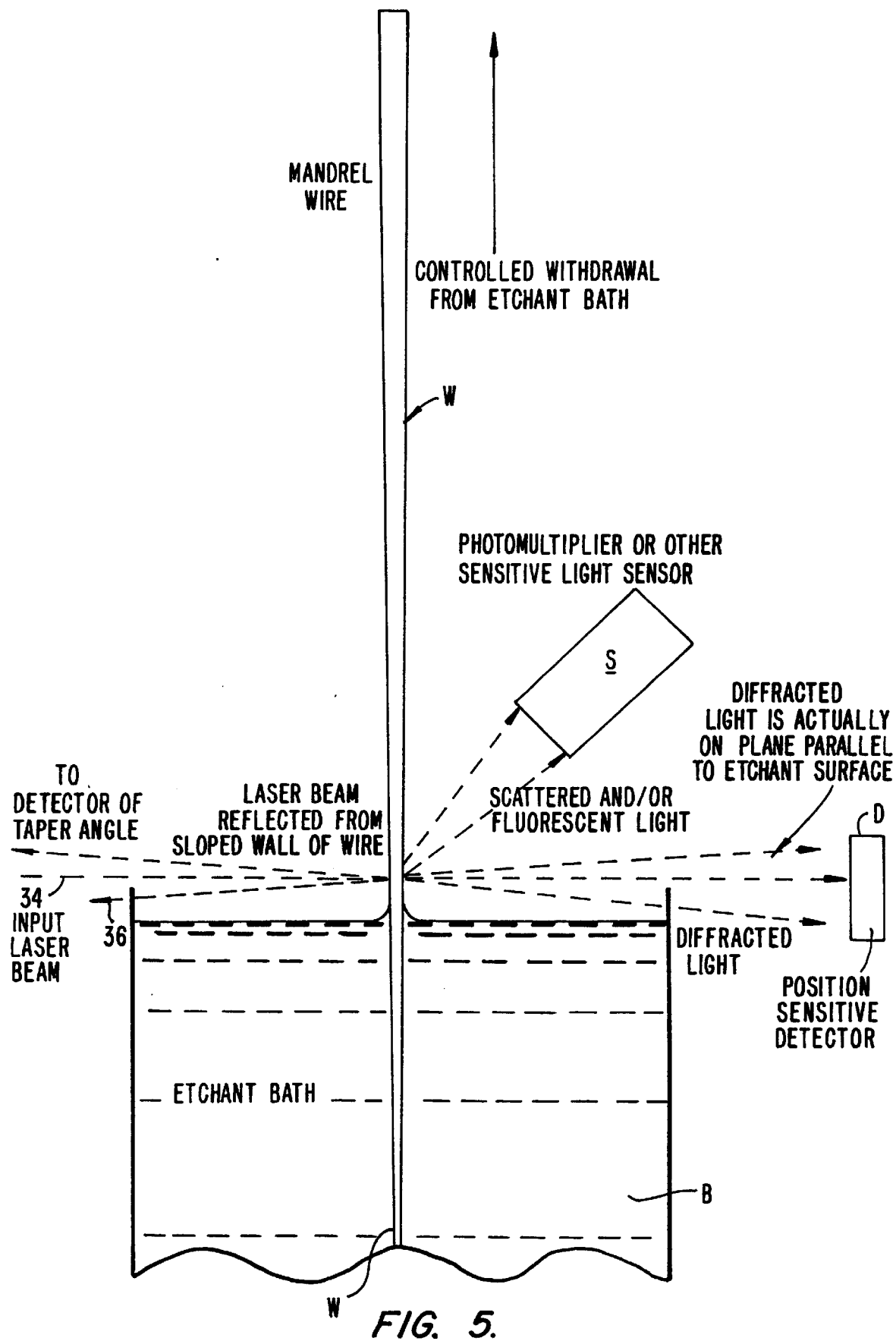
FIG. 5 is a view similar to FIG. 1 illustrating preferred apparatus for measuring both the size and slope of the withdrawn wire.

Referring to FIG. 5, it is important to monitor the diameter of metal or glass wire W immediately as it leaves etchant bath B. Input laser beam 34 is focussed on metal or glass wire W. For relatively large diameters, the focal spot may be scanned across the wire with the wire diameter being determined by obscuration of the laser beam. For smaller wire sizes, the light scattering diffraction pattern may be used to determine the diameter. The laser-determined measurements from this technique may be compared with independent optical microscopy measurements.

During the withdrawal of the expendable mandrel wire from the etchant, it is necessary to monitor the wire diameter as it exits the bath to allow for the production of the optimal wire profile. It is also highly desirable to be able to simultaneously determine the slope of the wire to verify that the withdrawal speed is correct for the continued achievement of the correct profile. Input laser beam 34 illuminating metal or glass wire W directly above etchant bath B is an unfocused laser beam. By observing the scattered and reflected beam, it is possible to obtain both diameter and slope information.

Regarding the slope of metal or glass wire W, the wire is observed by measuring the angle of back reflected light 36. Back reflected light 36 takes the form of a band having the low divergence angle of the incident laser beam in the vertical direction. It is most convenient (and accurate) to observes the light which is reflected directly or nearly directly back towards the laser. Initial experiments have shown that the angle of reflected light from a 2 mW He-Ne laser can be measured with glass fibers of only ≈1 micron diameter. Fiber wall tilts of ≈1 mrad were easily observed. Slope angles of at least an order of magnitude smaller should be achievable. A somewhat higher-power laser would be desirable for these very small wires.

The diameter of metal or glass wire W can be observed by two methods. Input laser beam 34 is incident on detector D, which can be a CCD array. If the wire is not too small, a clear interference pattern can be observe in the band of light; especially in the forward direction near the laser axis. This fringe spacing is well correlated with the wire diameter. When the wire gets below a certain size, the fringes get too far apart for convenient measurement. For these small diameters, the wire size can be determined by the intensity of the scattered light. Of course, this intensity measurement can also be used for the larger diameters. The scattered laser light or fluorescent light from the mandrel wire may be monitored by viewing the scattered light in a direction off-the-plane from the incident laser light using a sensitive photo detector as such as a photomultiplier tubes. Alternatively, the intensity of the diffracted and scattered light may be observed on the plane of the laser beam.

For wire sizes down to ≈1 micron, the diameter could also be simply observed with a microscope. The complication of this is the technical difficulty of viewing the wire directly above the etchant, since the objective lens would have to be partly below the etchant surface.

Other options include capacitive sensing of the diameter and taper of metal or glass wire W.

Vacuum evaporation or sputtering will generally be used to deposit the reflecting capillary interior material. Due to the very low angles of incidence of the reflected radiation, only very thin layers are needed. It will be understood that electroplating or electroless processes are generally utilized for building up the wire diameter, although the could potentially be used for the reflecting material.

Various ways are available to introduce grooves or slits into the built-up wire for allowing access of the etchant solution to the mandrel wire. This process may be accomplished by mechanical means such as a diamond saw or by chemical etching. It is important to select a process that does not deform the materials and cause distortion or blockage of the capillary bore. In this respect, reinforcing coating materials which do not plasmically deform are preferred.

The etching speed of the mandrel wire may be determined by observing the dissolution rate of composite monocapillary material having an etchable glass core with a non-etchable glass cladding. This material may be drawn to yield fibers with varying core sizes, and the dissolution process observed under a microscope. This data is then used to determine the groove spacing.

Since etching progresses into a blind hole, it is not possible to pump etchant through the capillary. Different means to improve the etch rate may be utilized. One obvious way to effect the rate is by varying the temperature of the etchant. Another is by ultrasonic agitation. It is important, however, to assure that cavitation does not cause damage to the capillary wall. A third technique is to periodically reduce the hydrostatic pressure of the etchant bath while heating the capillary until vapor bubbles form (i.e., boiling at reduced pressure). This will force the etchant out of the capillary. Upon repressurization, the vapor bubbles will collapse and fresh solution will be drawn back into the capillary bore. This will flush out the dissolved mandrill material and introduce fresh etchant much more effectively than diffusion.

The performance evaluation method of the product of this invention may be briefly summarized so that utility of the invention is understood. The arrangement for measuring the gain of the capillary consists of a slit to define the beam so that it fills the entrance aperture of the capillary, followed by a short ionization chamber to measure the incident X-ray intensity. The capillary is aligned to the X-ray beam by attaching each end of the capillary's rigid support member to X-Y stages by means of flexures. The stages can be used to bring the capillary into the x-ray beam, as well as tilting it for fine alignment. Measurement the total transmission of X-rays through the device is maximized with an ion chamber as the capillary is adjusted. This measurement will give the experimental value for the gain, which will be compared to the theoretical gain obtained by measuring the diameters of the entrance and exit apertures of the capillary.

The use of thermal processing described thus far may be necessary to produce a very smooth surface on the wire, since the as-etched surface is likely not to be smooth on the atomic scale. The method of thermal processing of the glass has a high probability of success. As proof, some of the best x-ray optical surfaces are constructed out of so call "float glass". This is simply glass that is cooled from the molten state, leaving a very flat surface with extremely low surface roughness.

Figure 6:
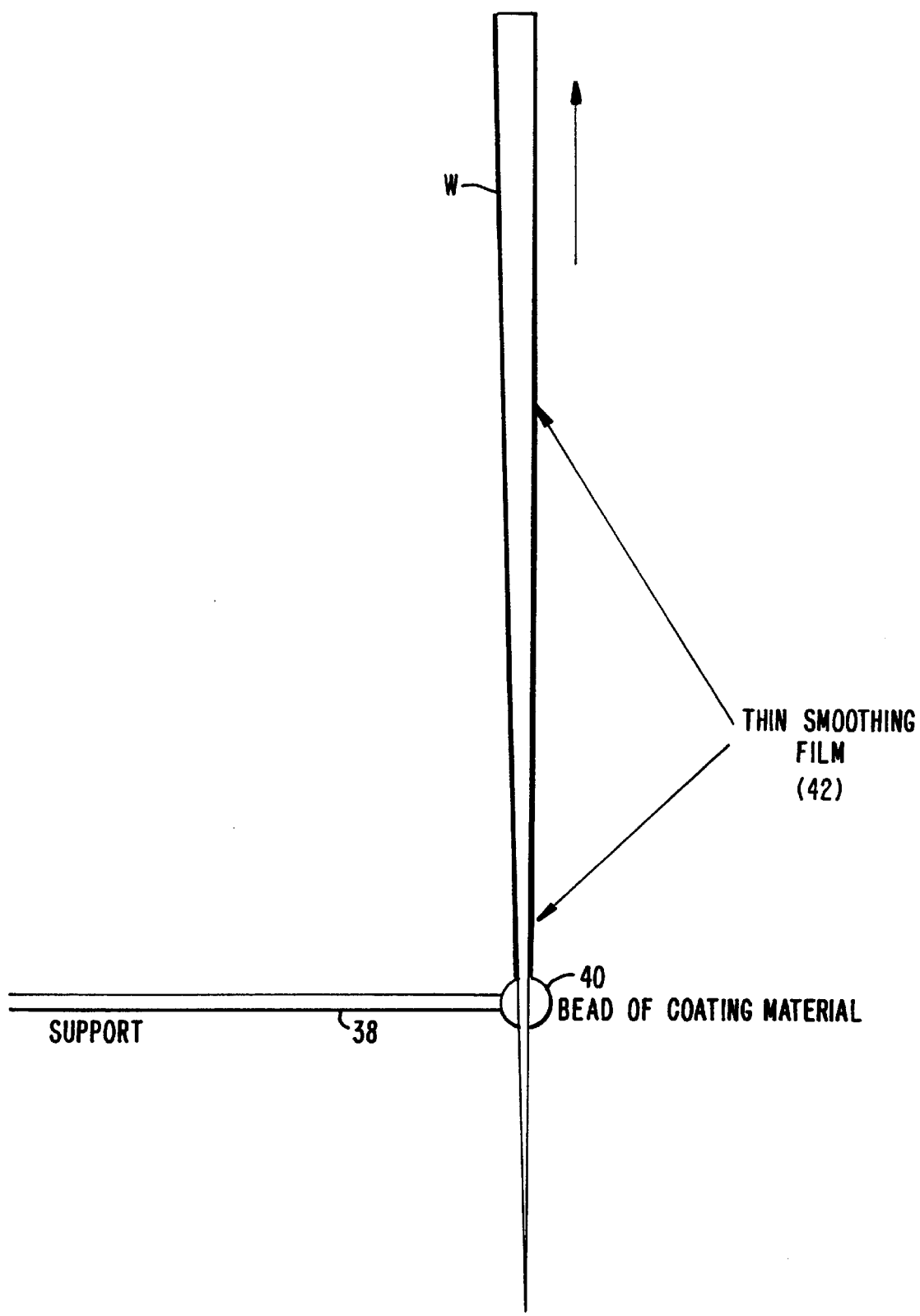
FIG. 6 is a schematic of a coating material used for reducing surface roughness being placed on the wire withdrawn from the bath of either FIG. 1 or FIG. 5.

In the event that thermal processing is found to be problematic, there is another solution to the problem of creating a smooth wire surface. Referring to FIG. 6, this second method is to dip-coat the mandrel with a very thin layer of material that melts at a temperature well below the softening point of the glass. Viewing FIG. 6, support 38 holds by capillary attraction bead 40 of coating material. metal or glass wire W is drawn through bead 40 to produce thin coating 42 on metal or glass wire W. This coating layer will cover up any wire surface-roughness.

The question then becomes, are there any coating materials which will form a thin and extremely smooth surface? Certain organic compounds are indeed known to supercool into a glassy state with a very smooth surface (A. C. Faberge, Carbon Support Films for Electron Microscopy by Deposition on an Organic Glass, *Jour. Phys. E: Scientific Instruments*, 7, 95–98 (1974). In this case, the as-etched mandrel could simply be drawn through a bead of the molten coating material. Certain thermoplastic polymers may also work for this coating.

A promising materials for the coating ispolyethylene phthalate. This is a water insoluble polymer which has a flow point of 135° C. The material is readily dissolved in acetone. This polymer hardens without crystallization into a hard glassy material which has a surface roughness measured by atomic force microscopy of below 5 Angstroms. The thickness of the coating will be determined by the viscosity (which is temperature dependent), and the speed of the wire through the bead of molten material.

It is worth noting that there have been examples of synchrotron x-ray optics created by the lacquer coating of diamond-turned metal mirrors, to smooth out the diamond machining marks. This lacquer surface is then coated with a metal film to make it more reflective to x-rays. Initially, these optics seem to work very well. The problem with this approach is that the lacquer experiences radiation damage and eventually forms bubbles which destroys the optics.

The smoothing layer will be easily dissolved when the glass core is removed. There is an additional attractive aspect of this approach if the layer is not soluble in the wire etchant, but dissolves in a common solvent, such as acetone. In this case, the mandrel wire may be removed, without exposing the radiation reflecting coating to the etchant acid, due to the protective presence of the layer. After the wire is etched away, the thin smoothing layer is dissolved in the solvent with no adverse effect on the capillary interior material. This would alleviate concerns about surface roughening of the capillary interior during the removal of wire mandrel. This approach would also make it easier to use a metal mandrel wire, if that was found to be desirable.

Figure 7:
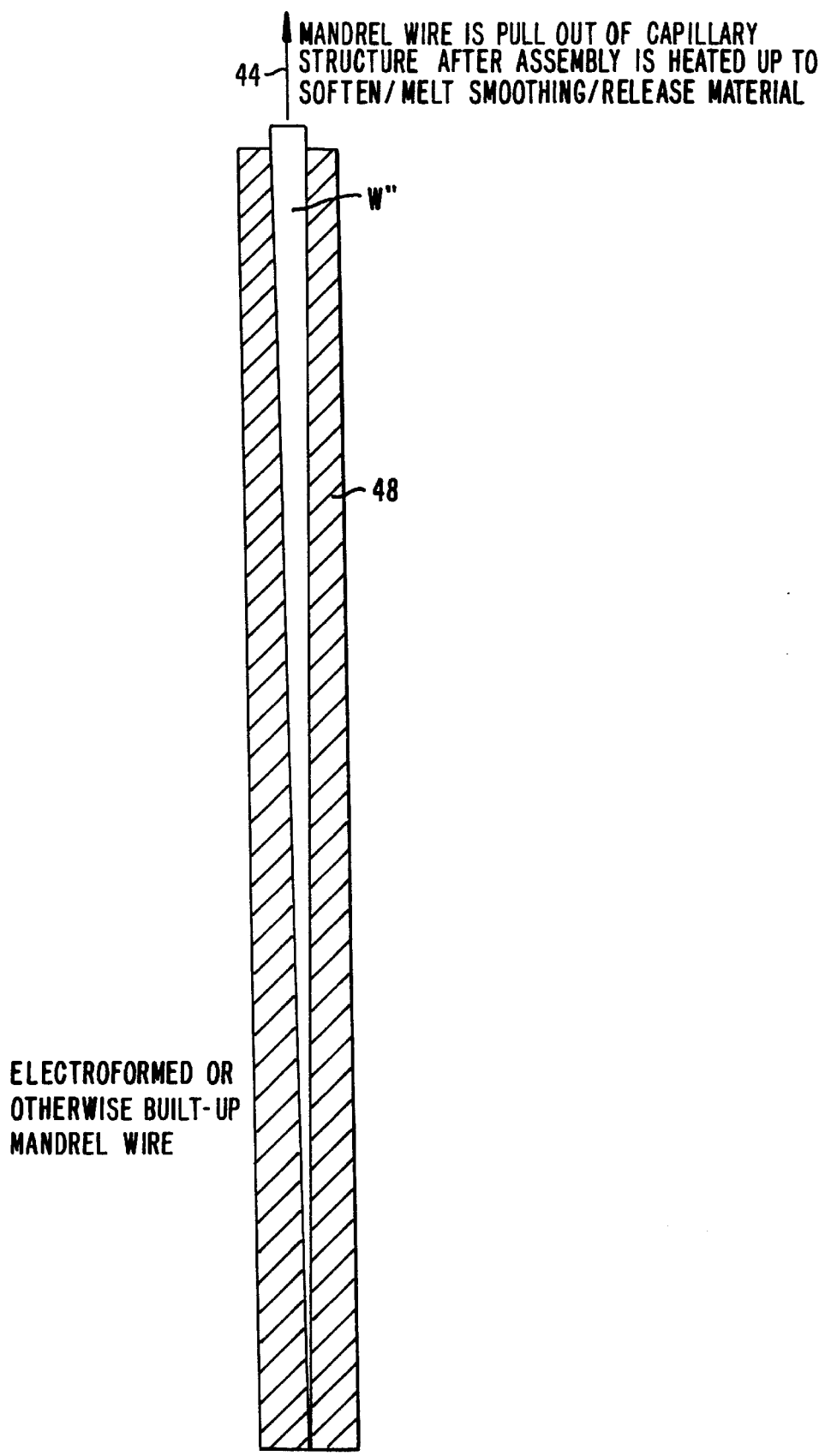
FIG. 7 illustrates the mandrel wire within the built up cylinder of FIG. 3 immediately prior to the mandrel wire being withdrawn leaving the end product of the process as an alternate step to the slit and etch step of FIG. 4.

Referring to FIG. 7, where the smoothing layer is successful, this leads to a further potential improvement in the fabrication process; the removal of the mandrel wire without chemical etching and the attendant cutting of etching grooves in the assembly. In this approach, coated wire W" is placed within the material utilized to form the capillary (FIG. 3). Thereafter, coated wire W" is heated to the point where the coating and smoothing layer liquefies. The mandrel metal or glass wire W is then removed by simply pulling it out from the large diameter end in the direction 44 relative to capillary material 48. In this case, the smoothing layer also functions as a type of mechanical release layer. The remaining smoothing layer material is then dissolved and the capillary is dried.

Figure 8:
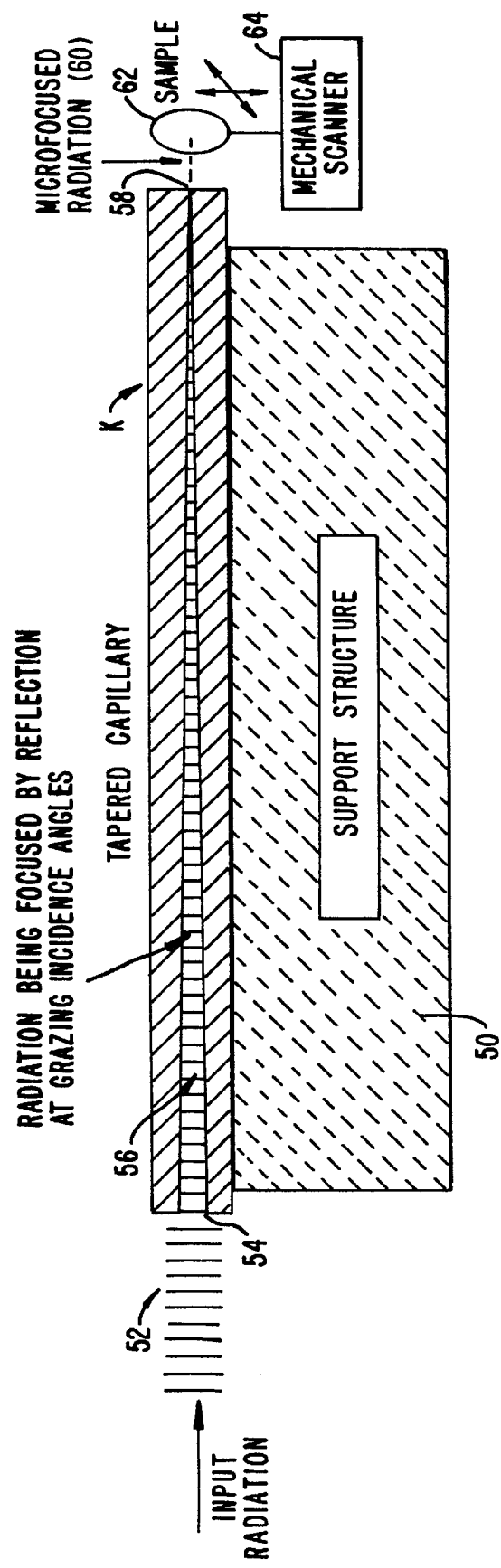
FIG. 8 illustrates schematically the capillary optic in use for examining a sample.
Figure 6:
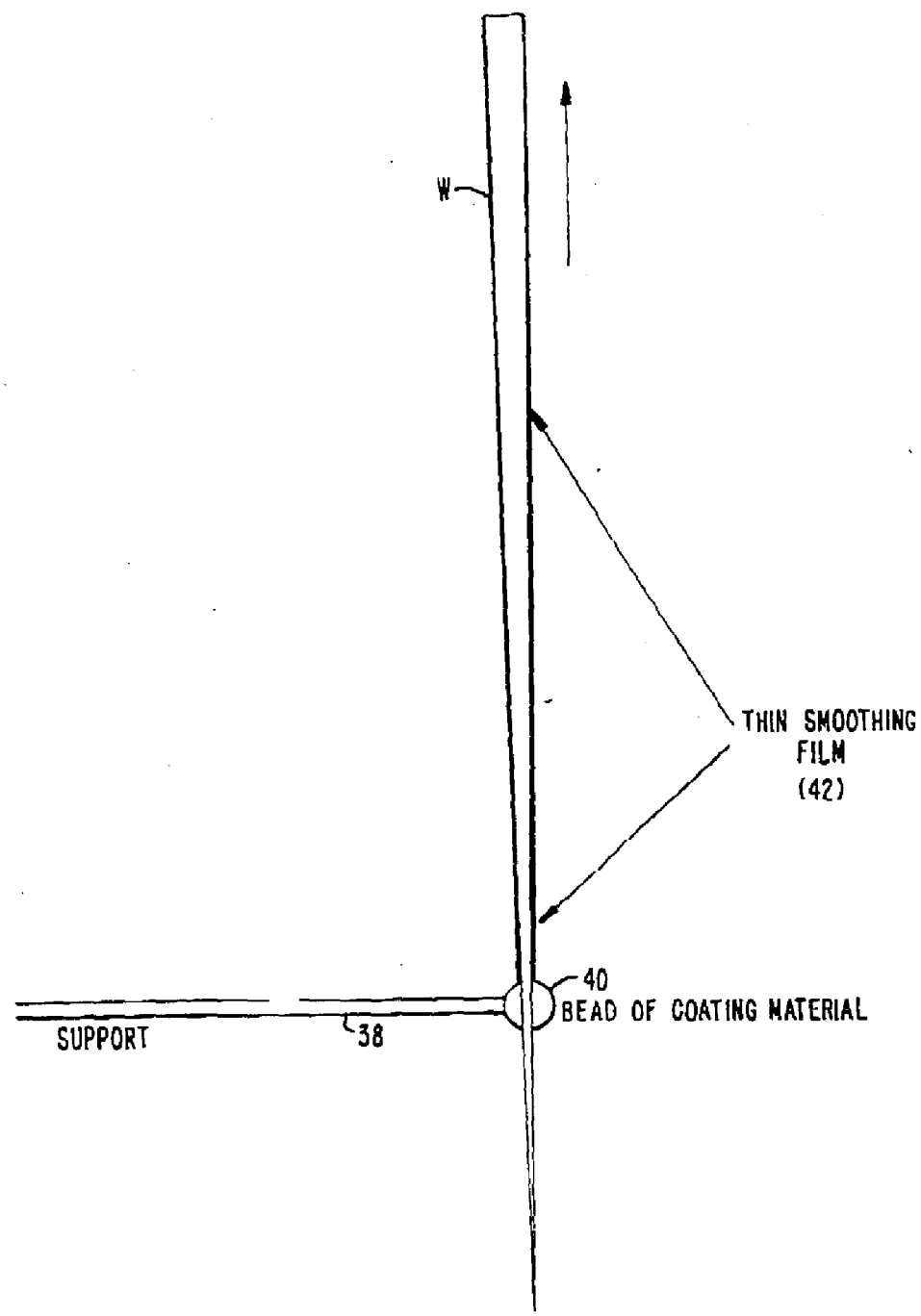
Figure 7:
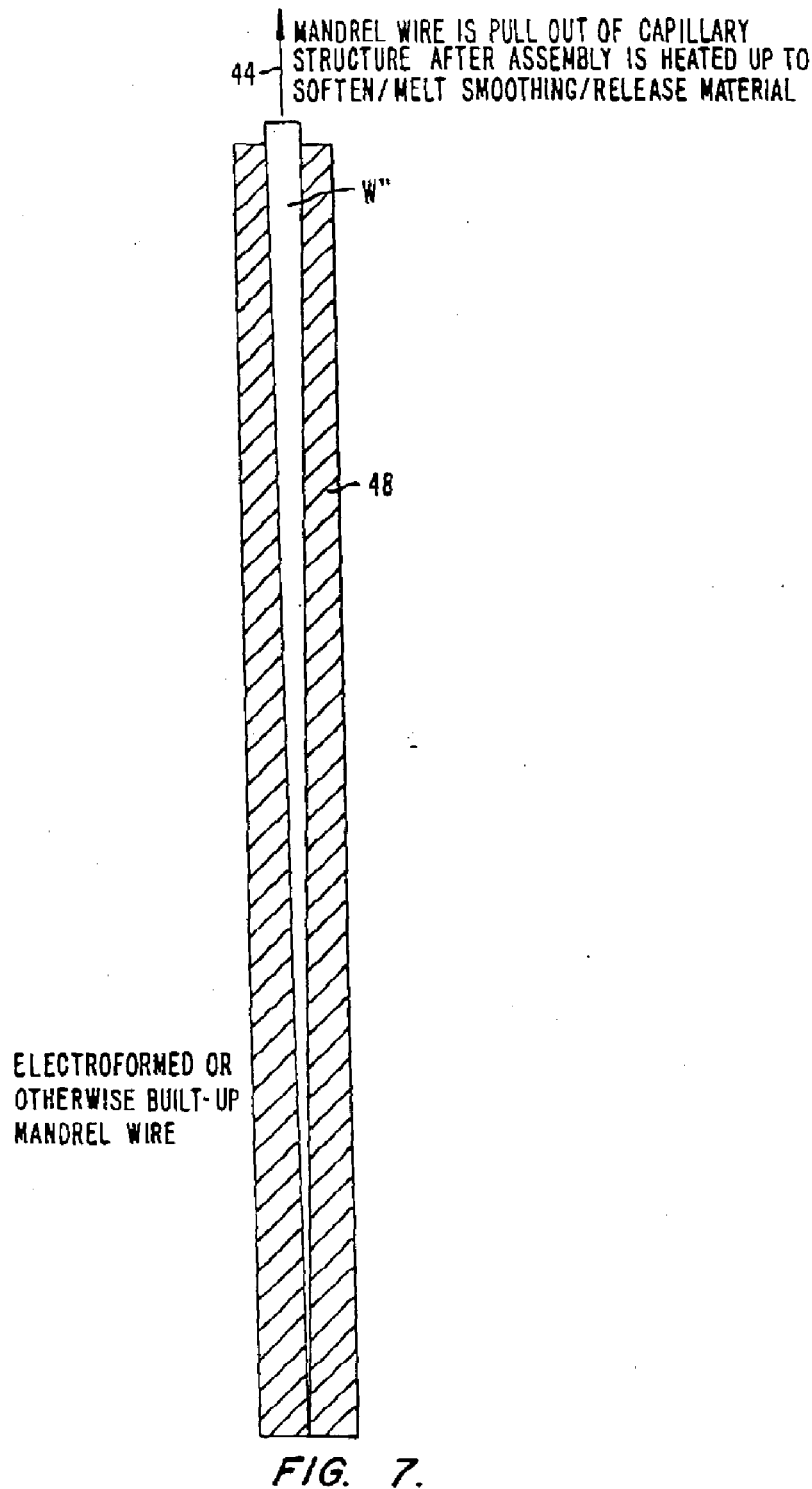
Figure 8:
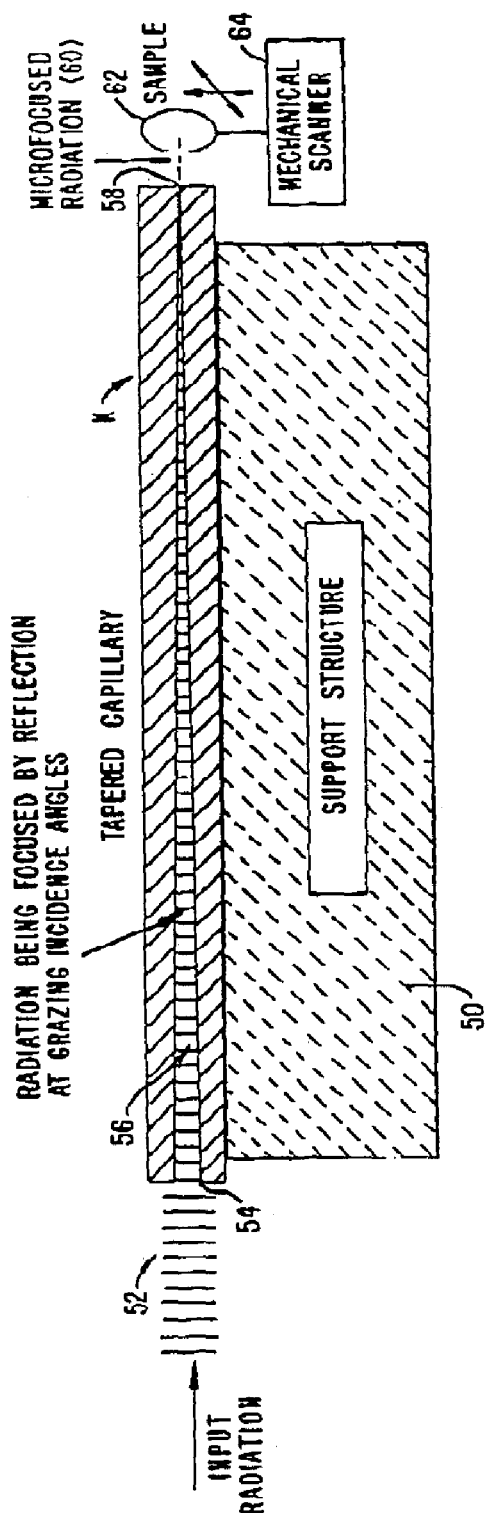

Referring to FIG. 8, capillary K is mounted to support structure 50 to receive radiation 52. Radiation 52 could be from any conventional source (not shown) such as X-ray tube, synchrotron radiation source, neutron source, or some other source of photons or neutrons. Radiation 52 is incident on large capillary input 54 and micro-focussed by total external reflection at grazing incidence angles inside capillary bore 56. Micro-focussed radiation 60 exits small capillary opening 58 and is incident on a sample 62. Sample 62 is typically positioned by sample scanner 64 to align microfocussed radiation 60 to the area of interest. Transmitted radiation, fluorescent radiation, diffracted beams or other signals are collected to study sample 62.

An especially good method for drying the interior of the final capillary structure is to use the critical-point drying method. This method displaces the remaining ethcant or coating-material with a liquid or solvent having a low temperature critical point. This liquid is then heated above its critical point and the liquid-vapor phase boundary disappears. The dense super-critical medium is then removed by gradual reduction of the pressure, and a dry capillary results This process eliminates any problems due to the concentration of any contamination, and possible blockage of the capillary, as any remaining liquid dries.

What is claimed is:

1. A process for producing a tapered capillary optic of desired taper for focusing radiation comprising the steps of:
   providing an etchant bath;
   providing a wire to be etched by the etchant bath;
   placing the wire in the etchant bath to a preselected depth for etching;
   withdrawing the wire from the preselected depth at a controlled rate to form a differential etch to form a tapered wire with a desired taper having the desired taper profile of the tapered capillary optic;
   coating the tapered wire with a coating reflective of the radiation to be focused by the capillary optic to produce a coated wire; and,
   removing the tapered wire from the coated wire to leave only a coated bore having the desired taper for focussing radiation.

2. A process for producing a tapered capillary optic for focusing radiation according to claim 1 comprising the further steps of:
   reinforcing the coating reflective of the radiation to be focused by applying further coating to the wire.

3. A process for producing a tapered capillary optic for focusing radiation according to claim 1 comprising the further steps of:
   fastening the coating reflective of the radiation to a supporting substrate.

4. A process for producing a tapered capillary optic for focusing radiation according to claim 2 comprising the further steps of:
   tensioning the tapered wire during the reinforcing step to maintain the wire linear.

5. A process for producing a tapered capillary optic for focusing radiation according to claim 1 comprising the further steps of:

the removing step includes:

placing the coated wire on a supporting substrate;

cutting the coated wire to produce at least one cut at a selected intervals on the supporting substrate; and, etching the coated wire through the at least one cut to remove the tapered wire.

6. A process for producing a tapered capillary optic for focusing radiation according to claim 1 comprising the further steps of:

withdrawing the tapered wire from the preselected depth at a controlled rate includes:

measuring dimension of the tapered wire at the etchant bath; and, varying the controlled rate of withdrawal of the tapered wire dependent upon the measured dimension.

7. A process for producing a tapered capillary optic for focusing radiation according to claim 6 comprising the further steps of:

measuring slope of the tapered wire as it leaves the etchant bath; and, controlling the rate of withdrawal from the etchant bath dependant upon the slope.

8. A process for producing a tapered capillary optic for focusing radiation according to claim 1 wherein the step of removing the wire to leave only the coating includes:

coating the tapered wire with a release coating for releasing the coating reflective of the radiation to be focused by the capillary optic; and, pulling the wire from the release coating.

9. The product of the process of claim 1.

10. A process for producing a tapered capillary optic of desired taper for focusing radiation comprising the steps of:

providing a tapered wire with the desired taper profile of the tapered capillary optic;

coating the tapered wire with a coating reflective of the radiation to be focused by the capillary optic to produce a coated wire; and, removing the tapered wire from the coated wire to leave only a coated bore having the desired taper for focussing radiation.

11. A process for producing a tapered capillary optic for focusing radiation according to claim 10 comprising the further steps of:

reinforcing the coating reflective of the radiation to be focused by applying further coating to the coated wire.

12. A process for producing a tapered capillary optic for focusing radiation according to claim 10 comprising the further steps of:

fastening the coating reflective of the radiation to a supporting substrate.

13. A process for producing a tapered capillary optic for focusing radiation according to claim 11 comprising the further steps of:

tensioning the tapered wire during the reinforcing step to maintain the tapered wire linear.

14. A process for producing a tapered capillary optic for focusing radiation according to claim 10 comprising the further steps of:

the removing step includes:

placing the coated wire on a supporting substrate;

cutting the coated wire to produce at least one cut at a selected intervals on the supporting substrate; and, etching the coated wire through the at least one cut to remove the tapered wire.

15. A process for producing a tapered capillary optic for focusing radiation according to claim 10 wherein the step of removing the wire to leave only the coating includes:

coating the tapered wire with a release coating for releasing the coating reflective of the radiation to be focused by the capillary optic; and, pulling the wire from the release coating.

16. The product of the process of claim 10.

17. A process for producing a tapered capillary optic for focusing radiation according to claim 10 wherein the step of removing the wire to leave only the coating includes:

coating the tapered wire with a release coating for releasing the coating reflective of the radiation to be focused by the capillary optic; and, pulling the wire from the release coating.

18. Apparatus for producing a tapered capillary optic for focusing radiation comprising:

an etchant bath;

a wire to be etched by the bath;

means for placing the wire in the bath to a preselected depth for etching by the bath and withdrawing the wire from the preselected depth at a controlled rate to form a differential etch on the wire to taper the wire with the desired taper profile of the capillary optic;

means for coating the tapered wire with a coating reflective of the radiation to be focused by the capillary optic; and, means for removing the wire to leave only the coating with an internally tapered bore for focussing radiation.

19. Apparatus for producing a tapered capillary optic for focusing radiation according to claim 18 further comprising:

means for measuring the dimension of the wire at the etchant bath; and, means for controlling the rate of withdrawal of the wire dependent upon the measurement including a feedback loop.

20. The process for producing a tapered capillary optic of desired taper for focussing radiation according to claim 1 and wherein the coating step includes:

a first coating for smoothing the wire; and, a second coating for being reflective of the radiation interior of the bore.

21. The process for producing a tapered capillary optic of desired taper for focussing radiation according to claim 1 and including the further step of:

heating the tapered wire to smooth the surface of the tapered wire.

22. The process for producing a tapered capillary optic of desired taper for focussing radiation according to claim 1 and wherein the coating step includes:

critical point drying the interior of the bore after removal of the tapered wire.

* * * * *

UNITED STATES PATENT AND TRADEMARK OFFICE
CERTIFICATE OF CORRECTION

PATENT NO. : 5,772,903
DATED : June 30, 1998
INVENTOR(S) : Gregory Hirsch

It is certified that error appears in the above-identified patent and that said Letters Patent is hereby corrected as shown below:

Drawings,
Delete the Drawing Sheets 6-8 and substitute therefor attached Drawing Sheets 6-8.

Column 4,
Line 17, delete the mathematical equation and replace it with
-- $\delta = 1/2\pi(e^2/mc^2)(N_o\rho/A)Z\lambda^2 = 2.70 \times 10^{10}(Z/A)\rho\lambda^2$ --;

Column 6,
Lines 56-57, replace both occurrences of "mandrel-etchant" with -- mandrel-wire --;

Column 7,
Line 34, delete "when the mandrel wire is etched away";

Column 11,
Lines 65-67, delete the quotation marks after "W"" on both occurrences;

Column 16,
Line 15, please cancel claim 17.

Signed and Sealed this

Sixteenth Day of November, 2004

JON W. DUDAS
*Director of the United States Patent and Trademark Office*